(No Model.) 2 Sheets—Sheet 1.

C. W. CHASE.
COMBINED HARROW, PULVERIZER, AND LEVELER.

No. 426,242. Patented Apr. 22, 1890.

Witnesses
Walter S. Bowen
K. Dunfoy

Inventor
Carroll W. Chase,
By his Attorneys
C. C. Shawkey (No Model.) 2 Sheets—Sheet 2.
C. W. CHASE.
COMBINED HARROW, PULVERIZER, AND LEVELER.

No. 426,242. Patented Apr. 22, 1890.

Witnesses
Walter S. Bowen
K. Durfee

Inventor
Carroll W. Chase,
By his Attorneys
C. A. Shaw & Co.

UNITED STATES PATENT OFFICE.

CARROLL W. CHASE, OF DOVER, NEW HAMPSHIRE.

COMBINED HARROW, PULVERIZER, AND LEVELER.

SPECIFICATION forming part of Letters Patent No. 426,242, dated April 22, 1890.

Application filed January 20, 1890. Serial No. 337,477. (No model.)

*To all whom it may concern:*

Be it known that I, CARROLL W. CHASE, of Dover, in the county of Strafford, State of New Hampshire, have invented certain new and useful Improvements in a Combined Harrow, Pulverizer, and Leveler, of which the following is a description sufficiently full, clear, and exact to enable any person skilled in the art or science to which said invention appertains to make and use the same, reference being had to the accompanying drawings, forming part of this specification, in which—

Figure 1:
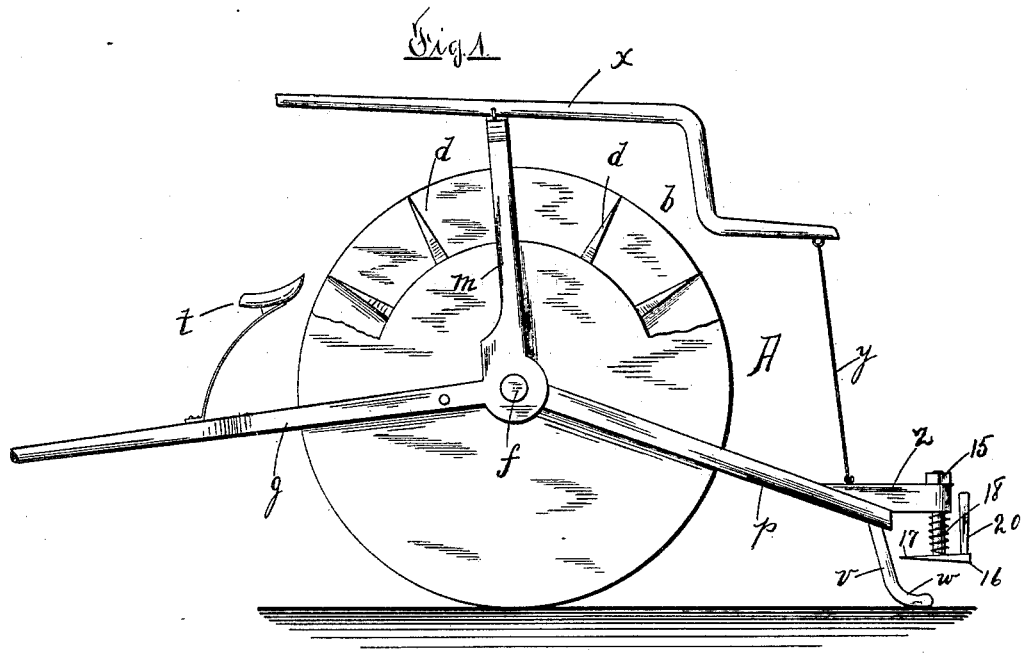
Figure 2:
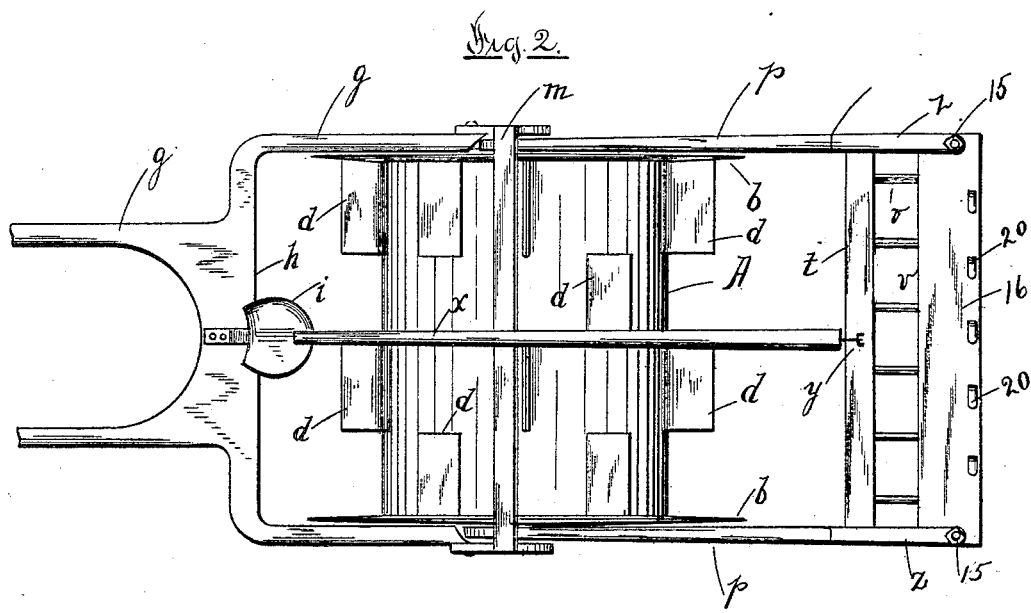
Figure 3:
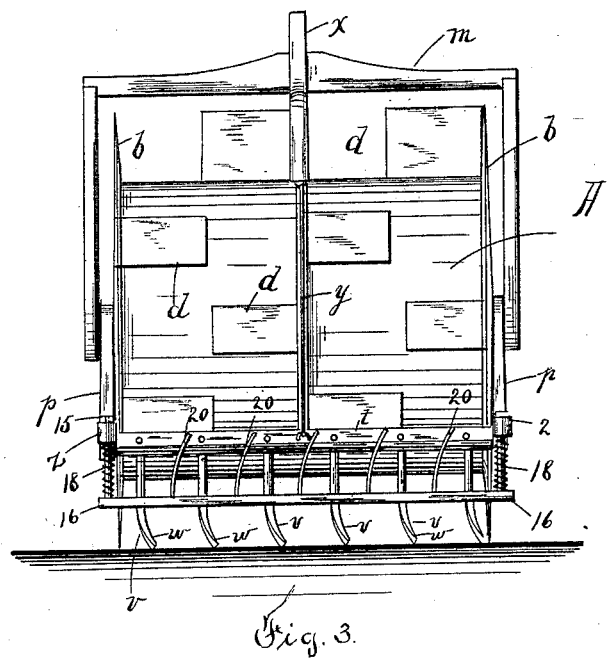

Figure 1 is a side elevation of my improved machine; Fig. 2, a top plan view of the same; Fig. 3, a rear end elevation, and Fig. 4 a sectional view illustrating details of construction.

Like letters and figures of reference indicate corresponding parts in the different figures of the drawings.

My invention relates to a combined harrow, pulverizer, and leveler for preparing the ground for planting; and it consists in certain novel features, hereinafter fully set forth and claimed, the object being to produce a simpler, cheaper, and more effective device of this character than is now in ordinary use.

The nature and operation of the improvement will be readily understood by all conversant with such matters from the following explanation.

In the drawings, A represents the body of the machine, which consists of a cylindrical barrel, at each end of which an annular flange $b$ is secured. Said flanges are preferably drawn to a thin edge and form the bearing of the machine on the ground. Radially arranged pulverizing-blades $d$ are secured to the barrel, said blades being preferably arranged in four series on the periphery of said barrel, the blades of each series alternating with those of the adjacent series. These blades are designed to cut or break up the clots or bunches of plowed earth to prepare them for the harrow. The cutting-flanges $b$ also perform a similar function. An axle $f$ is secured in the axial line of the barrel and shafts $g$ are mounted on the ends thereof, said shafts being connected by a cross-bar $h$, on which a driver's seat $i$ is disposed. A frame $m$ is secured to the inner ends of the shafts consisting of two side bars connected at their tops by a cross-bar extending across and above the barrel. Two rearwardly-projecting arms $p$ are pivoted by one end to the ends of the axle $f$, respectively.

Figure 4:
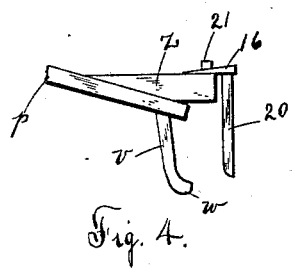

A harrow consisting of a horizontal bar $t$, provided with a series of downwardly-projecting teeth $v$, is secured to the outer ends of the arms $p$. These teeth have their lower ends wedge-shaped (see Fig. 3) and curved or bent rearwardly and diagonally at $w$ to present a curved cutting or harrowing edge to the pulverized earth as it leaves the blades $d$. A lever $x$ is pivoted centrally to the cross-bar of the frame $m$, its forward end being disposed so that it can readily be manipulated by the driver. A rod $y$ connects the rear end of said lever with the harrow. The arms $p$ being pivoted on the axle by means of the lever and rod, the driver may readily elevate the harrow to enable it to pass over any obstructions. A horizontal block $z$ projects rearwardly from each arm $p$, and in the outer end of each block a vertically-arranged bolt or rod 15 is fitted to slide. To the lower ends of said bolts a horizontally-arranged leveling-blade 16 is secured, said blade being arranged transversely on the machine and presenting a horizontal cutting-edge 17 to the earth as it passes through the harrow-teeth. A coiled spring 18 is disposed around each bolt 15 between the blocks $z$ and blade 16, said springs serving to cushion said blade. A series of vertical harrow-teeth 20 are secured in the rear edge of the blade 16, said teeth being formed in practically the same shape as the teeth $v$, but inclined laterally in the opposite direction. These teeth 20 are inoperative when the blade 16 is employed as a leveler, as shown in Figs. 1, 2, and 3. By disconnecting the blade 16 from the bolts 15, inverting it, and securing it to the blocks $z$ by bolts 21, so that the blades 20 are pendent, as shown in Fig. 4, they may be employed as harrow-teeth. Said teeth being arranged to alternate with the harrow-teeth $v$, (see Fig. 3,) and when inverted being inclined in opposite directions, the earth may be broken or harrowed much finer than when the teeth $v$ only are employed.

By employing the blades $d$ on the body A to break or pulverize the earth, the harrowing may be accomplished by the use of comparatively few teeth, and by combining the pulverizer, harrow, and leveler in one machine, as described, the ground may be prepared to receive seed with the expenditure of much less time and labor than is ordinarily required.

Having thus explained my invention, what I claim is—

1. In a device of the character described, a pulverizer comprising a cylindrical body provided with radial cutting-blades, an axle, and shafts, in combination with a harrow mounted in arms pivoted on the axle and provided with a series of laterally and outwardly curved teeth, substantially as described.

2. In a device of the character described, the combination of a pulverizer comprising a cylindrical body provided with an axle, shafts, and radial cutting-blades, a harrow mounted in arms pivoted to said axle, and a leveler comprising a spring-cushioned horizontal blade mounted on said harrow, substantially as described.

3. In a device of the character described, a pulverizer comprising a cylindrical body having annular flanges at its ends, radial cutting-blades, an axle, and shafts, in combination with a harrow pivoted on the axle to follow said pulverizer, a spring-cushioned leveling-blade on said harrow, and a lever mounted on a frame on the axle and secured to the harrow, substantially as described.

4. The combination of a cylindrical pulverizer having radial blades with a harrow mounted in arms on the axle of the pulverizer and a horizontal leveling-blade on said harrow provided with a series of harrow-teeth, said blade being adapted to be inverted on the harrow-frame and throw said teeth into action, substantially as described.

5. The adjustable spring-cushioned leveling-blade 16, provided with the harrow-teeth 20, and mounted on the arms $p$, in combination with the pulverizer A, substantially as described.

6. The pulverizer A, having the blades $d$, in combination with the shafts $g$ and frame $m$, the harrow $t$, mounted in arms $p$, and having teeth $v$, the leveler 16 mounted on said harrow and provided with teeth 20, and the springs 18, substantially as described.

CARROLL W. CHASE.

Witnesses:
GEORGE E. DENGIN,
CHRIS. W. JACKSON.